Sept. 23, 1952           F. W. ROSS           2,611,563

AIRPLANE CONTROL SYSTEM

Filed Nov. 28, 1947

INVENTOR.
FREDERICK W. ROSS
BY
*C. H. Fowler*
ATTORNEY

Patented Sept. 23, 1952

2,611,563

UNITED STATES PATENT OFFICE 2,611,563

AIRPLANE CONTROL SYSTEM

Frederick W. Ross, Dearborn, Mich.

Application November 28, 1947, Serial No. 788,341

2 Claims. (Cl. 244—83)

This invention relates to airplanes, and more particularly to aerodynamic control systems therefor including roll, yaw, and pitch controls which have characteristics that reduce the skill required to pilot an airplane and that reduce the dangers of piloting an airplane.

All airplanes, in order to be maneuvered while flying in the air and during take-off and landing, have devices to control the angular position of the airplane with respect to the surrounding air and the ground. These devices are known collectively in the art as the aerodynamic control system, and when used in conjunction with the engine controls provide means for guiding the airplane through all maneuvers.

The aerodynamic control system consists of three principal controls or elements which are referred to by those skilled in the art as a roll control, such as an aileron, to control the roll angle of the airplane, a yaw control, such as a rudder, to control the yaw angle of the airplane, and a pitch control, such as an elevator, to control the pitch angle or angle of attack of the airplane with respect to the oncoming air.

In maneuvering an airplane by these aerodynamic controls in conjunction with the engine controls, it is necessary for the pilot to coordinate properly the amount of and the time of application of each control during each instant of each maneuver. In particular, the coordination of the roll control with the yaw control, which is necessary in order to perform a true-banked or properly coordinated turn, requires considerable skill and much practice on the part of the pilot, is difficult to master, and has been a source of danger, the pilot often failing to coordinate properly at a time when the dangers of a spin are imminent. The incident invention aims to improve the characteristics of the aerodynamic control system referred to so as to reduce the pilot skill required, to reduce the time required to learn to pilot, and to reduce the dangers of piloting an airplane.

An object of the invention is to provide an aerodynamic control system with improved means for automatic coordination of the roll control with the yaw control.

Another object of the invention is to provide an aerodynamic control system with improved means for operating the roll control in combination with the yaw control by a single control lever.

Another object of the invention is to provide an aerodynamic control system with means for automatic coordination of the roll control with the yaw control and which bestows upon the airplane improved performance.

Other objects and advantages of the invention will appear from the following description when considered in connection with the drawings forming a part of this specification, and in which.

Figure 1:
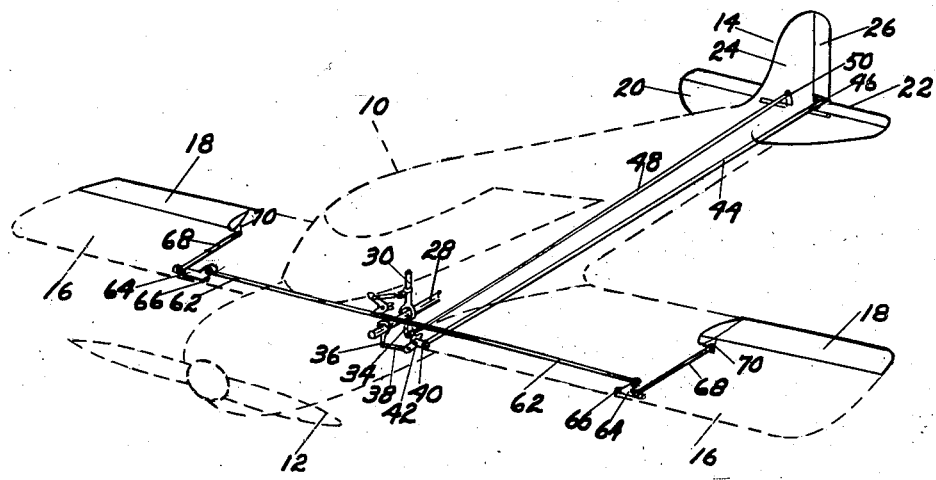
Fig. 1 is a perspective view of an airplane illustrating the control system as installed.

Referring to the drawings for more specific details of the invention 10 represents a fuselage having suitable housing facilities for a pilot and passengers, and also suitable housing for a power plant, not shown, for driving a propeller 12. The fuselage also carries conventional empennage 14.

Oppositely disposed wings 16 of like structure are secured to the fuselage, and ailerons 18 are hinged to the trailing edges thereof and the wings support a main landing gear, not shown, preferably of the retractable type.

The empennage 14 consists of a conventional fixed horizontal stabilizer 20 with oppositely disposed corresponding elevator surfaces 22 hinged to the trailing edge thereof, and a fixed vertical fin 24 with a rudder 26 hinged to its trailing edge.

A torque tube 28 is suitably supported for rotation about its axis in longitudinal relation to the fuselage 10, and a control stick 30 pivotally supported on the torque tube 28, as by a pin 32 extending diametrically through the tube, has a dependent arm 34, the purpose of which will hereinafter appear.

An arm 36 fixedly secured on the torque tube 28 is connected by a link 38 to one arm of a bell crank 40 mounted on a fixed pivot 42, and the other arm of the bell crank is connected by a push-pull rod 44 to a horn 46 on the rudder 26, and the dependent arm 34 of the control stick 30 is connected as by a push-pull rod 48 to horns 50 on the elevators 22.

An arm 52 fixedly secured to the control stick 30 at a suitable elevation above the pivot 32 of the stick is pivotally connected as at 54 to one end of a link 56 the other end of which is connected to one arm of a bell crank 58 mounted on a fixed pivot 60, and the other arm of the bell crank 58 is connected by push-pull rods 62 to bell cranks 64 mounted on fixed pivots 66 and connected in turn by links 68 to horns 70 on the ailerons 18.

The control system is operative in the following manner: when the airplane is being maneuvered for a turn to the right, for example, the control stick 30 is moved to the right. This movement of the stick rotates the torque tube 28 and transmits force through the arm 36, the link 38, the bell crank 40, the push-pull rod 44 and the horn 46 to deflect the rudder 26 with its trailing edge to the right of its normal position. This movement of the rudder impresses a turning moment on the airplane, yawing its nose to the right.

Simultaneously with this rudder movement, force is transmitted through the arm 52 on the control stick, the link 56, the bell crank 58, the push-pull rods 62, the bell cranks 64, the links 68 and the horns 70 on the ailerons, so that the right aileron trailing edge is moved up from its normal position and the left aileron trailing edge is moved down. This aileron movement impresses a rolling moment on the airplane causing it to roll with the right side low and banking the airplane for a turn to the right.

Movement of the control stick aft rotates the stick about pin 32. This movement of the stick transmits force through the dependent arm 34, the push-pull rod 48, and the horn 50 to rotate the elevator 22, raising the trailing edge thereof. During flight this elevator movement lowers the tail of the airplane and hence increases the angle of attack of the airplane. Since the lift of the wings 16 is greater for a greater angle of attack and is lesser for a lower speed, then for normal flight conditions the angle of attack is greater for lower airplane speed.

Also, during all maneuvers involving a turn, the lift on the wing must be increased by increasing the angle of attack so as to provide centripetal force for performing the turn. During all flight maneuvers then the angle of attack is controlled by the position of the elevator through the fore and aft position of the control stick. For low angles of attack the control stick 30 is held in a forward position, and for increasing angles of attack the control stick is held in correspondingly farther aft positions.

This definite relation between the control stick position and angle of attack may be slightly modified an unimportant amount by extraneous effects such as by the influence of the propeller slip stream on the elevator. The latter introduces no important influence on the operation especially for airplanes which have the rudder in the slipstream where the change in effectiveness of the rudder compensates for the change in effectiveness of the elevator.

Figures 2, 3:
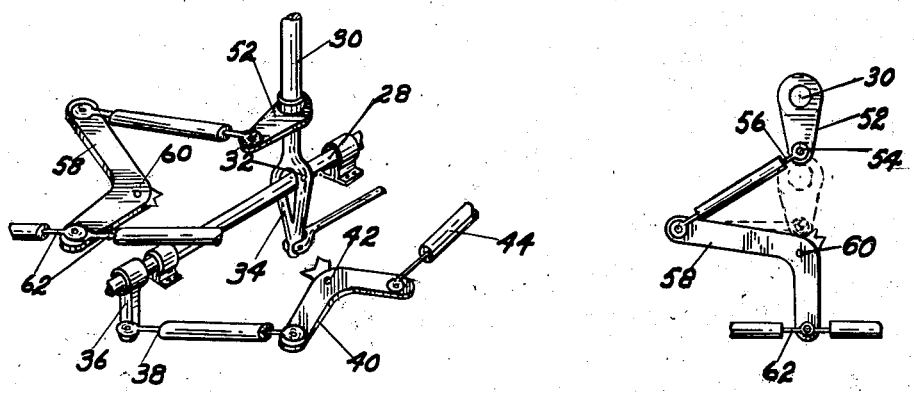
Fig. 2 is a perspective view of the control system partly broken away.
Fig. 3 is a fragmentary top plan view.

The linkage connecting the control stick to the ailerons is arranged so that the angular deflection of the ailerons for a particular amount of lateral displacement of the control stick, is greater for the more forward pitch settings of the control stick and is lesser for the more aft settings. This is illustrated in Figs. 2 and 3.

Lateral motion of the control stick also moves the arm 52 laterally. This results in the transmission of force through an adjustor, comprising the link 56 and the bell crank 58, the push-pull rods 62, the bell cranks 64, and the links 68 to the horns 70 on the ailerons 18. The link 56 can rotate about its connections at each end. When the control stick is in a more forward position the arm 52 fastened to the control stick 30 also is in a more forward position and the pivot 54 is closer to the fixed pivot 60. Likewise aft positions of the control stick introduce correspondingly greater separations of pivot 54 and the fixed pivot 60.

The linkage connecting the arm 52 to the ailerons 18 arranged as described provides, in effect, a lever with pivot at axis 60, and a lever arm of fixed length between the pivot 60 and the connection of the bell crank 58 and push-pull rods 62, and a lever arm of variable length between pivot 60 and the pivot 54. The lateral motion of pivot 54 as described hereinbefore, causes an opposite lateral motion of push-pull rods 62, the proportion of lateral motion being determined by the particular fore or aft position of pivot 54 with respect to axis 60 (as described hereinbefore).

The control system in this way provides a means whereby the proportion of roll control moment to yaw control moment is variable and is determined by the position of the elevator control. This system provides means whereby, with a single pilot's control lever, a greater amount of yaw control is simultaneously obtained along with a particular amount of roll control for elevator or pitch control settings corresponding to greater angles of attack. Hence, the system comprises an interconnected roll control and yaw control which provides greater yaw control at lower airspeeds where the angle of attack is higher.

The greater proportion of yaw control thus obtained at higher angles of attack, provides a means for essentially eliminating the effects of the greater adverse yaw which occurs at the higher angles of attack with application of a particular amount of roll control, and makes it possible to perform banked turns with the airplane which closely approximate true-banked turns by using only a single control lever.

In performing a complete turn to the right with the control system of the incident invention as described hereinbefore, the control stick is pressed to the right until the desired bank is established and is pressed slightly aft to account for the increased centripetal force needed to perform the turn. After the bank is established, the control stick 30 is returned approximately to neutral laterally, the slight aft shift in position being held. The stick 30 is held in this position until it is desired to recover from the turn. For the recovery the operations are reversed with the control stick being returned finally to the original position prior to the start of the turn.

Turns to the left are performed by using left hand motion of the stick in place of right hand motion, and vice versa.

With this system of aerodynamic control then the pilot need not perform the difficult coordination of hand operated aileron control with a separate foot operated rudder control, as must be done with the conventional three-control system as used on nearly all airplanes prior to this invention.

This coordination of separate rudder and aileron controls is performed through observation of tipping (in roll) by the pilot as he sits in the seat, and can be learned and acquired only after many hours of practice. In addition, since the observation of this tipping is rather difficult to detect it may pass unobserved during times of stress when the pilot is in danger as when near the ground during landing or take-off and when he is flying the airplane near the stalling speed. Under these conditions an inadvertent stall and improper coordination can lead to a spin and consequent crash.

With the control system of the incident invention the pilot need not learn the coordination of separate rudder and aileron controls, and hence the difficulties of learning to fly are greatly reduced. The dangers of improper coordination are also eliminated, since the coordination is performed automatically by the control system.

The control system of the incident invention is an improvement over existing control systems which do not require coordination of the aileron and rudder control. Control systems of this type are referred to in the art as the "two-control" type as contrasted to the "three-control" type which have independent aileron and rudder control in addition to the independent elevator control.

Existing two-control types are of two kinds. In one kind, the airplane is designed to have comparatively high directional stability and with ailerons having comparatively low adverse yaw. For this kind of two-control system the adverse yaw is also greater for lower speeds than for higher speeds and consequently turns at speeds near the stall are not properly banked. For the second kind of two-control system in existence prior to this invention, the aileron and rudder are actuated by a single control lever. The ratio of roll control to yaw control, however, is constant so that the proportion of roll to yaw obtained is only correct for turns at one particular angle of attack. Consequently for turns made at all other angles of attack, the airplane slips or skids. The proportion of roll control to yaw control is usually selected for the lower angles of attack corresponding to higher speeds. Hence, for the higher angles of attack at lower speeds there is not adequate yaw control in proportion to the roll control to take care of the greater adverse yawing tendencies of the roll control at the lower speeds.

With the incident invention the ratio of yaw control moment to roll control moment, which is obtained by a single control lever motion is regulated by the pitch control setting which also controls the angle of attack. Hence, this invention automatically regulates the ratio of yaw control moment to roll control moment to take care of the increased adverse yawing tendencies of the roll control at lower speeds.

Consequently, with the incident invention good coordinated turns can be made at all speeds down to the stall speed. It is not necessary to restrict the pitch control to avoid the difficulties experienced with prior control systems of the "two-control" type at low speed near the stall. With the incident invention a useful lower speed and hence a better performance is obtained.

While this invention has been described in connection with certain specific embodiments, the principle involved is susceptible of numerous other applications that will readily occur to persons skilled in the art.

Having thus described the various features of the invention, what I claim as new and desire to secure by Letters Patent is:

1. In an aircraft, having a wing mounted thereon, an aerodynamic control system for the aircraft comprising a roll element mounted on the wing, a yaw element, and a pitch element, a control member pivotally mounted for rotation about two non-parallel axes, means interconnecting the control member to the pitch element to provide deflection thereof upon actuation of the control member about the first of its axes of rotation, means interconnecting the roll and yaw elements, said last mentioned means including a rockable member pivoted on fixed aircraft structure on an axis spaced with respect to the control member and in a plane perpendicular to said first axis, and means connected at one end to the control member at a point spaced from its first axis of rotation and at its other end to the rockable member at a point spaced laterally from said perpendicular plane.

2. In an aircraft an aerodynamic control system therefor comprising roll, yaw, and pitch elements, a control member mounted for rotation about two non-parallel axes, means interconnecting the control member to the pitch element to provide deflection thereof upon actuation of the control member about the first of its axes of rotation, means interconnecting the control member to the yaw element to provide deflection thereof upon actuation of the control member about the second of its said axis of rotation, means interconnecting the control member to the roll element to provide deflection thereof upon actuation of the control member about the second of its said axes of rotation, said last mentioned means including an adjustor means operably interconnected to the pitch element, said adjustor means to adjust the ratio of transmission of deflection of the control member to deflection of the roll element, said ratio of transmission being determined through the interconnection of the adjustor means to the pitch element by the positioning of the pitch element.

FREDERICK W. ROSS.

REFERENCES CITED

The following references are of record in the file of this patent:

UNITED STATES PATENTS

| Number | Name | Date |
|---|---|---|
| 1,830,429 | Elsby | Nov. 3, 1931 |
| 2,276,702 | Riparbelli et al. | Mar. 17, 1942 |
| 2,478,033 | Weick | Aug. 2, 1949 |

FOREIGN PATENTS

| Number | Country | Date |
|---|---|---|
| 323,881 | Germany | Aug. 11, 1920 |